(12) United States Patent
Benson et al.

(10) Patent No.: US 10,904,639 B1
(45) Date of Patent: Jan. 26, 2021

(54) SERVER-SIDE FRAGMENT INSERTION AND DELIVERY

(71) Applicant: Amazon Technologies, Inc., Seattle, WA (US)

(72) Inventors: Nicholas James Benson, Seattle, WA (US); Andrew Glass, Woodinville, WA (US); Srikanth Kiran Kotagiri, Redmond, WA (US); Lei Li, Kirkland, WA (US); Stefan Christian Richter, Seattle, WA (US); Rakesh Tangirala, Redmond, WA (US); Amarsingh Buckthasingh Winston, Seattle, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 608 days.

(21) Appl. No.: 15/494,914

(22) Filed: Apr. 24, 2017

(51) Int. Cl.
| | |
|---|---|
| *H04L 29/06* | (2006.01) |
| *H04L 29/08* | (2006.01) |
| *H04N 21/81* | (2011.01) |
| *H04N 21/2187* | (2011.01) |
| *H04N 21/234* | (2011.01) |
| *H04N 21/262* | (2011.01) |
| *H04N 21/472* | (2011.01) |
| *H04N 21/482* | (2011.01) |
| *H04N 21/845* | (2011.01) |
| *H04N 21/8547* | (2011.01) |
| *H04N 21/239* | (2011.01) |
| *H04N 21/2665* | (2011.01) |
| *H04N 21/231* | (2011.01) |

(52) U.S. Cl.
CPC ....... *H04N 21/812* (2013.01); *H04N 21/2393* (2013.01); *H04N 21/23106* (2013.01); *H04N 21/2665* (2013.01); *H04N 21/8456* (2013.01)

(58) Field of Classification Search
CPC ... H04L 65/608; H04L 65/4084; H04L 65/60; H04L 65/80; H04L 67/02; H04L 65/1083; H04L 65/4076; H04L 65/4092; H04L 67/306; H04N 21/26258; H04N 21/812; H04N 21/8456; H04N 21/2187; H04N 21/231; H04N 21/23109; H04N 21/23424; H04N 21/23439; H04N 21/2387
See application file for complete search history.

(56) References Cited

U.S. PATENT DOCUMENTS

| | | | |
|---|---|---|---|
| 8,611,428 B1 * | 12/2013 | Huang | ............... H04N 21/2365 |
| | | | 375/240 |
| 2011/0083144 A1 * | 4/2011 | Bocharov | .......... H04N 7/17318 |
| | | | 725/32 |

(Continued)

*Primary Examiner* — Nicholas R Taylor
*Assistant Examiner* — Ho T Shiu
(74) *Attorney, Agent, or Firm* — Weaver Austin Villeneuve & Sampson LLP

(57) ABSTRACT

Techniques are described for server-side fragment insertion and delivery of media content. After receiving a request to play back media content, a manifest is generated that includes fragments associated with the requested media content and fragments associated with different media content. A client device requests fragments from a media server according to the manifest, and the media server provides the correct fragment in response to the request.

16 Claims, 5 Drawing Sheets

(56) References Cited

U.S. PATENT DOCUMENTS

| | | | |
|---|---|---|---|
| 2014/0279852 A1* | 9/2014 | Chen | G06F 16/43 |
| | | | 707/609 |
| 2017/0041372 A1* | 2/2017 | Hosur | H04N 21/25883 |
| 2017/0171590 A1* | 6/2017 | Ma | H04N 21/231 |
| 2017/0264923 A1* | 9/2017 | Lacivita | H04N 21/47202 |

* cited by examiner

┌─────────────────────────────────────────────────────────────── 402
│ Quality: 4K UHD
│
│ Fragment A: Time range =0 minutes 1 seconds to 0 minutes 5 seconds,
│ Location = \Media\Movies\A093b2b_1.ismv
│ Fragment B: Time range = 0 minutes 6 seconds to 0 minutes 10 seconds,
│ Location = \Media\Movies\A093b2b_2.ismv
│ Fragment X: Time range =0 minutes 11 seconds to 0 minutes 15 seconds,
│ Location = \Media\Ads\B22x_1.ismv
│ Fragment Y: Time range = 0 minutes 16 seconds to 0 minutes 20 seconds,
│ Location = \Media\Ads\B22x_2.ismv
│ Fragment C: Time range =0 minutes 21 seconds to 0 minutes 25 seconds,
│ Location = \Media\Movies\A093b2b_3.ismv
│ Fragment D Time range = 0 minutes 26 seconds to 0 minutes 30 seconds,
│ Location = \Media\Movies\A093b2b_4.ismv
│
│ Quality: 1080P
│
│ Fragment A: Time range =0 minutes 1 seconds to 0 minutes 5 seconds,
│ Location = \Media\Movies\A093b2b_1.ismv
│ Fragment B: Time range = 0 minutes 6 seconds to 0 minutes 10 seconds,
│ Location = \Media\Movies\A093b2b_2.ismv
│ Fragment X: Time range =0 minutes 11 seconds to 0 minutes 15 seconds,
│ Location = \Media\Ads\B22x_1.ismv
│ Fragment Y: Time range = 0 minutes 16 seconds to 0 minutes 20 seconds,
│ Location = \Media\Ads\B22x_2.ismv
│ ...
└───────────────────────────────────────────────────────────────

*FIG. 4*

SERVER-SIDE FRAGMENT INSERTION AND DELIVERY

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Media streaming devices use a variety of media players to play back media content. Many older streaming devices include media players that cannot play back a bitstream that includes media content from more than one source (e.g., feature content and advertisement content). In addition, many streaming devices use media players that, with a software update, might be capable of playback of a bitstream that includes media content from more than one source. Unfortunately, the entity in control of delivering the media content is often different from the entity in control of the streaming devices and/or the update of their media players. Consequently, many streaming devices are currently unable to support playback of a bitstream that includes media content from more than one source

BRIEF DESCRIPTION OF THE DRAWINGS

FIG. 4 shows an example of a manifest for requesting fragments of media content.

DETAILED DESCRIPTION

This disclosure describes techniques for server-side fragment insertion, allowing for playback with a manifest that includes references to feature fragments and advertisement fragments. After a client device requests playback of media content, a media server retrieves a manifest that includes playback options for different types of fragments (e.g., feature fragments or advertisement fragments). The manifest is provided to the client device such that playback is not interrupted and users viewing the playback of the media content do not perceive the transition from playback of feature fragments to advertisement fragments. An example may be instructive.

Figure 1:
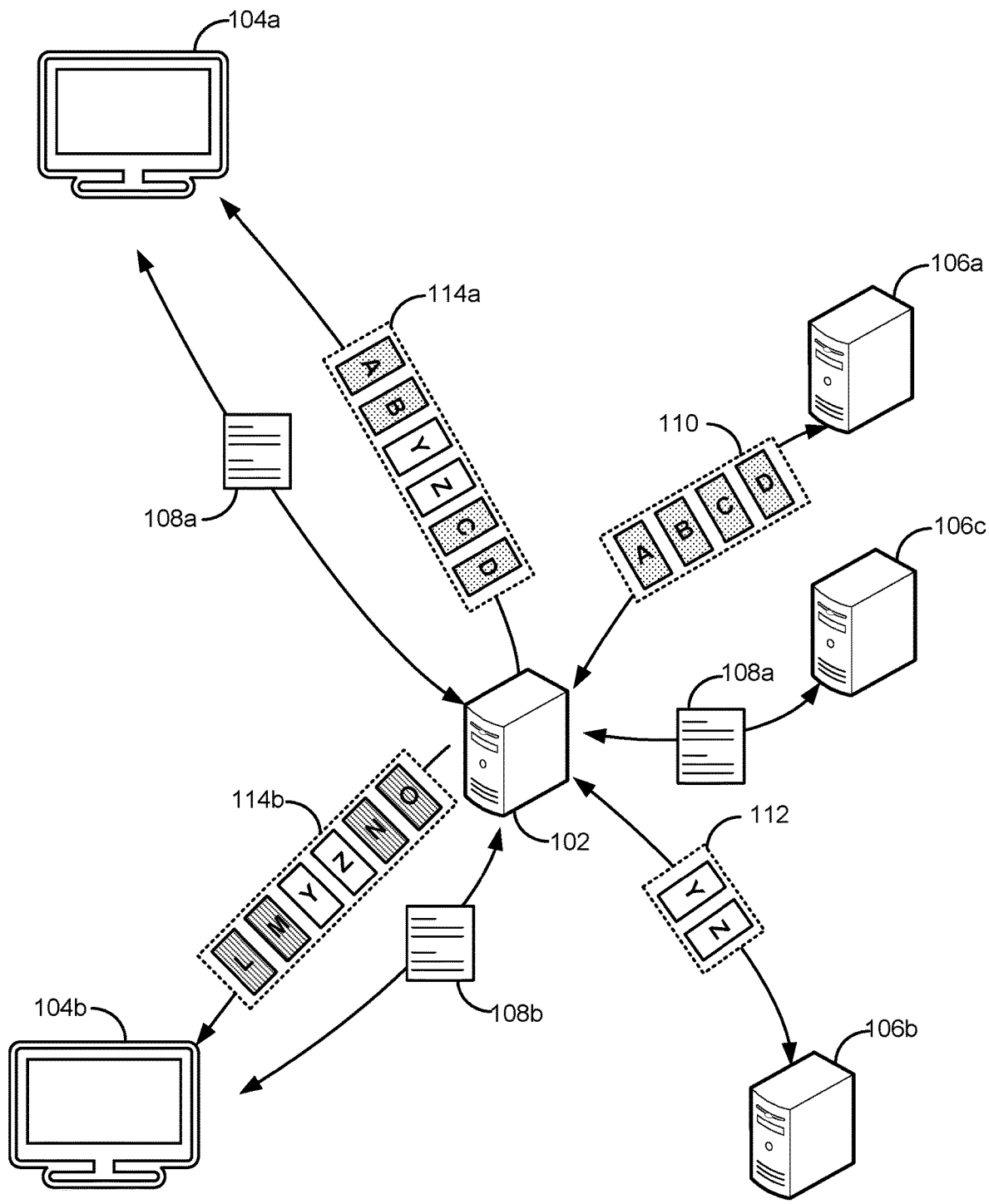
FIG. 1 illustrates an example of a server-side fragment insertion and delivery.

FIG. 1 illustrates an example of a server-side fragment insertion and delivery. As shown in FIG. 1, edge server 102 is one of many servers that are part of a content delivery network (CDN). CDNs facilitate distribution of encoded media content through a variety of software, hardware, and network components to client devices according to geographic proximity. In FIG. 1, edge server 102 communicates directly with client devices 104a and 104b, as well as with origin servers 106a and 106b. In some implementations, origin servers 106a and 106b are controlled by different providers (e.g., origin server 106a is a provider of feature content, and origin server 106b is a separate provider of advertisement content). Client device 104a is an electronic device such as a smart television (TV) that streams media content using a media player. For example, client device 104a connects with edge server 102 and requests playback of media content (e.g., an episode of Mozart in the Jungle). After edge server 102 receives the request, server 102 determines whether a previously generated manifest for the episode of Mozart in the Jungle is stored locally in a cache. In this example, the manifest provides a list of all available fragments for the episode of Mozart in the Jungle. Fragments represent portions (e.g., 2-10 seconds) of corresponding segments of media content that have been encoded at various quality levels and bitrates. If the manifest is stored locally, then edge server 102 provides the manifest to client device 104a. However, if the manifest is not stored locally, manifest server 106c generates manifest 108a and provides manifest 108a to edge server 102. Manifest server 106c uses manifest data from two separate manifests (e.g., a manifest for the episode of Mozart in the Jungle and a manifest for an advertisement for an upcoming season of Transparent, which are not depicted in FIG. 1) to generate manifest 108a. As such, when edge server 102 provides manifest 108a to client device 104a, manifest 108a includes references to fragments for both Mozart in the Jungle and the advertisement. After receiving manifest 108a, client device 104a uses manifest 108a to request fragments 114a from edge server 102. As edge server 102 receives each request, server 102 determines whether the request is for a feature fragment or an advertisement fragment. Edge server 102 makes this determination based on an identifier in a URL included in the request. Other information included as part of a request includes a protocol specification, an edge server location, a quality level, a media content type, an index of the fragment, and a length of the fragment, etc. In one example, a request for a feature fragment includes a URL such as http://www.example.com/Mozart.ism/QualityLevels(1000000)/Fragments(video=0). In another example, a request for an advertisement fragment includes a URL such as http://www.example.com/Mozart.ism/QualityLevels(1000000)/Fragments(video=30000000000)/AdStart(30000000000)/AdLength(5000000000)/AdID(TransparentAd).

After determining that the requested fragment is a feature fragment (e.g., fragment A), edge server 102 determines that the feature fragment is not stored locally in a cache. As such, edge server 102 requests feature fragments 110 from origin server 106a. Upon receiving the request from edge server 102, origin server 106a encodes feature fragments at the bitrates specified in manifest 108a and provides the encoded fragments to edge server 102. Edge server 102 then provides some of the feature fragments shown in fragments 114a to client device 104a. As playback continues, client device 104a eventually requests playback of advertisement fragments (e.g., fragments Y and Z) using manifest 108a. Similar to the feature fragments mentioned above, edge server 102 determines that the advertisement fragments are not stored locally. As such, edge server 102 requests advertisement fragments 112 from origin server 106b. Origin server 106b encodes advertisement fragments 112 and provides them to edge server 102, which provides fragments Y and Z as shown in fragments 114a to client device 104a. While the above-discussed process continues, client device 104b connects with edge server 102. Client device 104b requests playback of an episode of Sneaky Pete, and manifest 108b which was generated previously by manifest server 106c and stored in a cache at edge server 102. Client device 104b starts requesting fragments according to manifest 108b. In contrast to fragments 114a, fragments 114b (including advertisement fragments 112) had been previously requested by another user, and as such were previously encoded by origin server 106a and stored in a cache at edge server 102. Consequently, edge server 102 identifies the locally stored fragments and provides fragments 114b to client device 104b.

Figure 2:
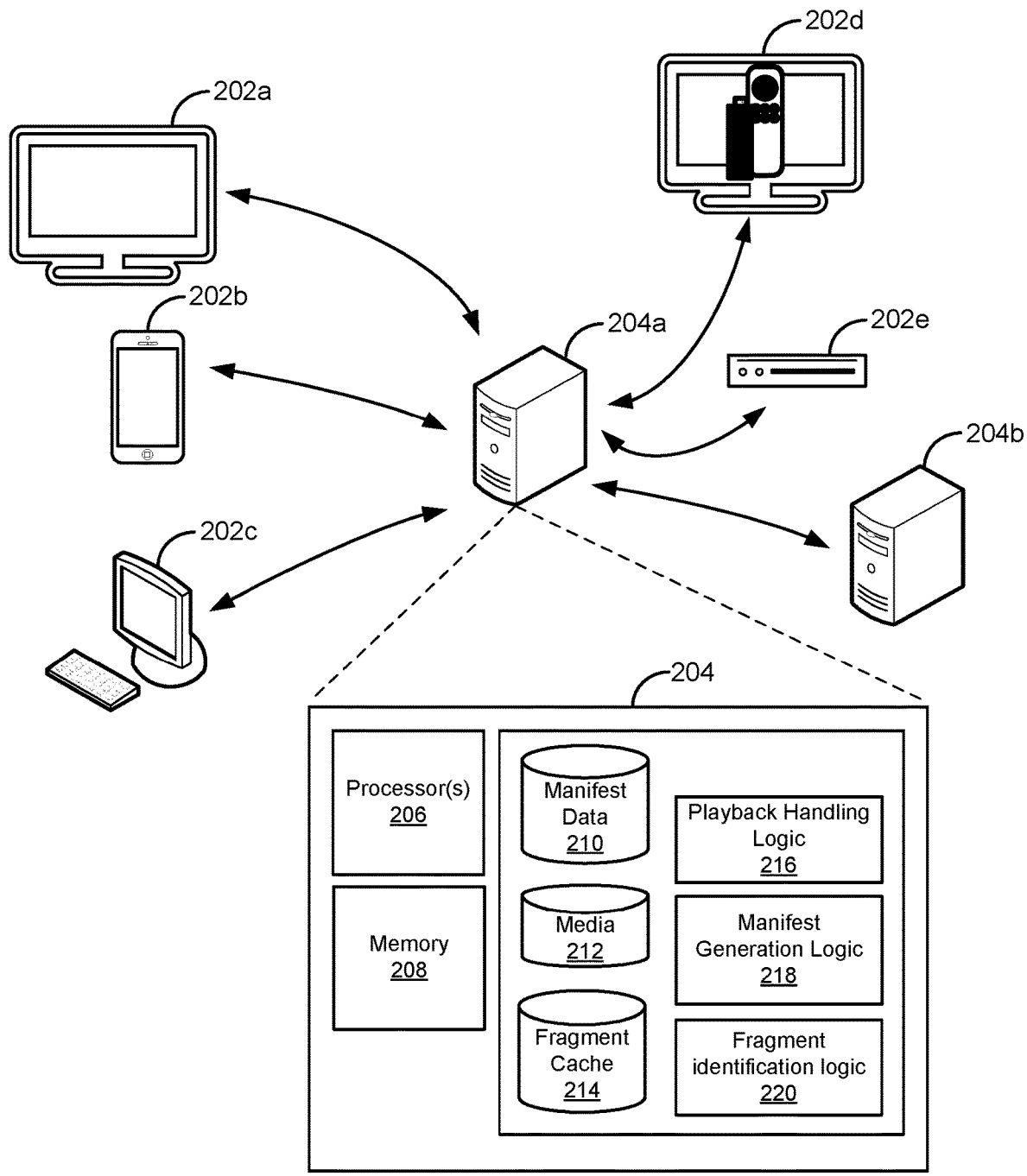
FIG. 2 illustrates an example of a computing environment using server-side fragment insertion and delivery.

FIG. 2 illustrates an example of a computing environment using server-side fragment insertion and delivery of media content. The computing environment of FIG. 2 includes origin server 204b that encodes and provides fragments to edge server 204a. Edge server 204a provides manifests and fragments to client devices 202a-e. Client devices 202a-e decode the encoded media content for playback on a display screen.

Edge server 204a and/or origin server 204b may be part of a content delivery system that conforms to any of a wide variety of architectures. The functionality and components of edge server 204a and/or origin server 204b can be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein may be implemented by one or more of different entities. For example, the functionality to generate a manifest can be handled by a separate server such as a manifest server. In another example, the functionality to provide playback of media content might be integrated into a video player or software client under control of one entity (e.g., on client devices 202a-e), integrated into a separate app from another entity, implemented in an edge server or content server of a CDN, a server of an ISP, etc.

In FIG. 2, client device 202a is a smart TV, client device 202b is a smartphone device, client device 202c is a desktop computer, client device 202d is a TV and media player stick (e.g., Amazon Fire TV Stick®), and client device 202e is a set-top box. In addition, related functionality may also be implemented within tablets, wearable devices, virtual or augmented reality headsets, video game consoles, etc.

Edge server 204a might conform to any of a wide variety of architectures, and its functionality may be implemented by a variety of physical servers and/or virtual servers. In some implementations, edge server 204a is partitioned to have separate virtual servers configured to perform different functions. In one example, one virtual server could generate manifests, and a second virtual server might provide generated manifests and fragments to client devices 202a-e. In another example, several virtual servers are configured to deliver fragments to each respective client devices 202a-e.

Edge server 204a includes one or more processor circuits 206, memory 208, and other hardware components to encode media content and provide the encoded media content to client devices 202a-e. For example, processor circuits 206 execute stored instructions in memory 208 of edge server 204a to implement encoding techniques disclosed herein. It should be noted that, while processor circuits 206, memory 208, manifest data 210, media database 212, fragment cache database 214, logic 216, 218, and 220 are contemplated as integrated with edge server 204a, implementations are contemplated in which some or all of their respective functionality is implemented independently of a single edge server 204a. It should also be noted that processor circuits 206, logic 216-220, or both processor circuits 206 and execute logic 216-220 can be implemented using special purpose circuitry, e.g., a field programmable gate array or an application specific integrated circuit.

In FIG. 2, edge server 204a includes various types of logic to retrieve manifests and provide fragments to client devices 202a-e. For example, edge server 204a includes playback handling logic 216 to provide proper playback of fragments and playback metadata to client devices 202a-e. Manifest generation logic 218 identifies manifest data for feature content and advertisement content in order to generate a manifest that may be properly used by client devices 202a-e. After generating a manifest, the manifest is stored in memory such as a local buffer and/or cache, memory 208, among manifest data 210, or media database 212. Edge server 204a uses fragment identification logic 220 to process fragment requests, determine sources of media content (e.g., feature fragment, advertisement fragment), and identify previously stored fragments stored in fragment cache 214.

Client devices 202a-e can also include various types of logic, for instance, decoder logic for decoding the encoded media content received from edge server 204a and playback handling logic to request playback of portions of media content. In addition, client devices 202a-e includes various types of memory to store and/or cache decoded media, one or more processors, and other hardware components to request and decode the encoded media content provided by edge server 204a. For example, the processors of client devices 202a-e execute stored instructions in memory to implement decoding techniques based on the encoding techniques disclosed herein.

It should be noted that, despite references to particular computing paradigms and software tools herein, the computer program product and the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3:
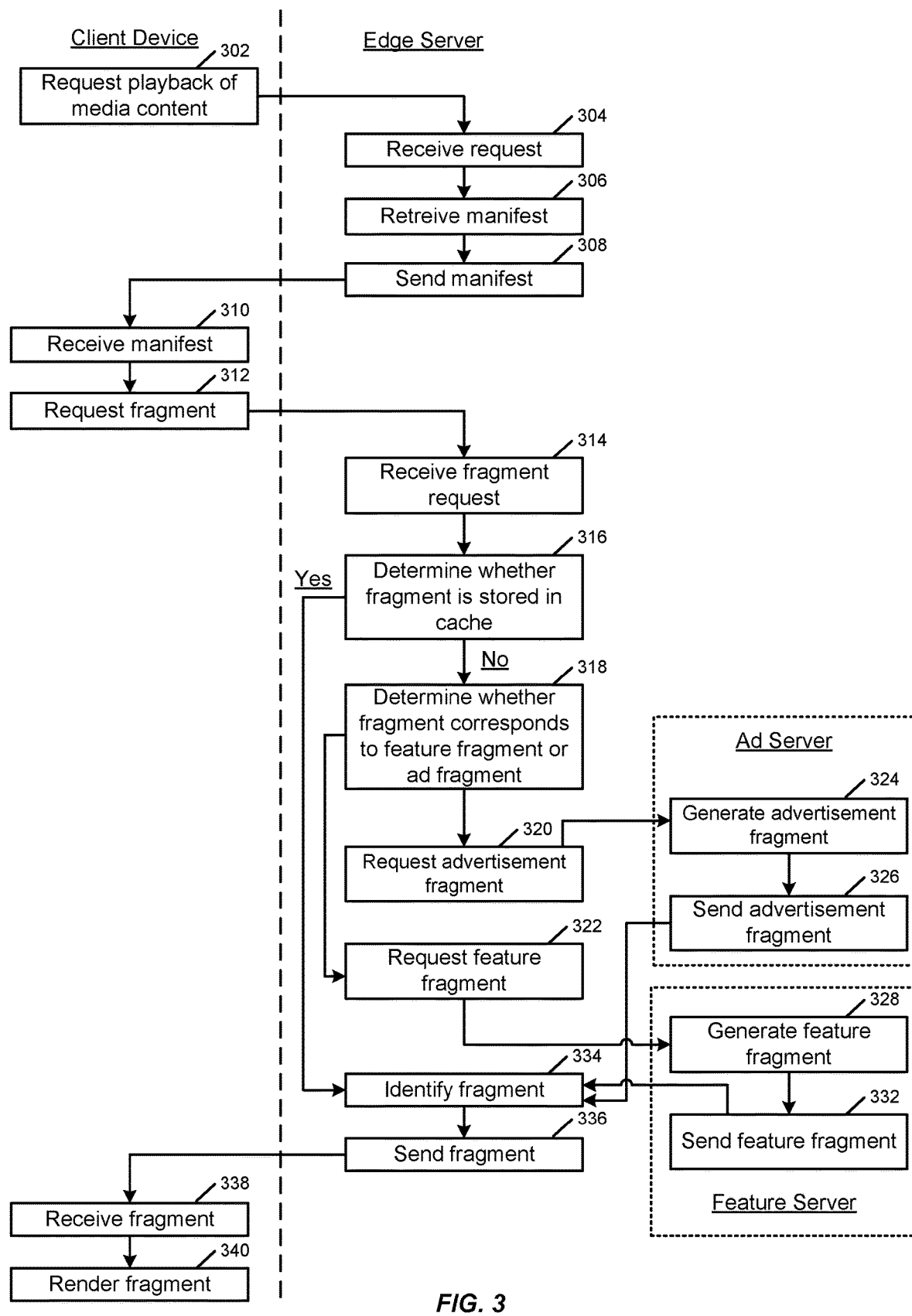
FIG. 3 is a flowchart illustrating server-side fragment insertion and delivery.

A specific implementation will now be described with reference to FIG. 1, the computing environment of FIG. 2, and the flow diagram of FIG. 3. To start streaming media, a user selects media content for playback on a client device (e.g., client device 104a of FIG. 1), for example, by selecting a video for playback from a video streaming service on their smart TV. Upon selection from the user, client device 104a sends an indication to edge server 102, allowing a connection to be established and for further communications to occur between client device 104a and edge server 102. Communication between client device 104a and edge server 102 may occur using different types of communication protocols. In one example, client device 104a communicates with edge server 102 using a stateful connection, for instance, a physical socket connection between edge server 102 and client device 104a. Examples of stateful network protocols include Real-Time Messaging Protocol (RTMP), Real-Time Messaging Protocol Encrypted (RTMPE), Multimedia Messaging Service (MMS), etc. In another example, client device 104a communicates with edge server 102 using a stateless connection, for instance, using the Hypertext Transfer Protocol (HTTP) along with manifest files to deliver media content.

Returning to FIG. 3, client device 104a sends a request (e.g., an HTTP request) for playback of the selected media content mentioned above (302), and the request is received by server 102 (304). In some implementations, the request includes a request for a manifest associated with the selected media content. A manifest includes metadata that allows the device to generate properly formatted requests for specific fragments of media content. Different types of manifests are requested according to the type of adaptive bitrate streaming protocol used by the client device. Examples of adaptive bitrate streaming protocols include Microsoft Smooth Streaming, Dynamic Adaptive Streaming over HTTP (DASH), HTTP dynamic streaming, HTTP live streaming (HLS), etc. To illustrate, a smart TV with a media player using the DASH protocol will play back media content using a manifest that is particular to DASH, whereas another media player using the Smooth Streaming protocol will play back media content using a manifest particular to Smooth Streaming.

After edge server 102 receives the request, edge server 102 determines whether a manifest for the requested media content is stored locally. If the manifest is not stored locally, then edge server 102 retrieves a manifest (306). In some cases, if a manifest has not been generated, a request is sent to a manifest server (e.g., manifest server 106c) that generates a manifest. In some implementations, the manifest includes references to advertisement fragments and feature fragments. Manifests can be generated dynamically based on a combination of data from a feature manifest and an advertisement manifest. For example, a feature manifest associated with an episode of Mozart in the Jungle and an advertisement manifest associated with a preview for Transparent. Different combinations of advertisement manifests can be used to generate dynamic manifests. Returning to the example above, an additional dynamic manifest can be generated using the feature manifest associated with episode of Mozart in the Jungle and a different advertisement manifest (e.g., an advertisement manifest associated with a preview for Sneaky Pete). In some implementations, for each advertisement to be included in playback of feature content, there is a separate manifest (e.g. one manifest for the Transparent advertisement and another manifest for the Sneaky Pete preview). As such, dynamic manifests may be based on a feature manifest and many advertisement manifests (e.g., 2, 3, 5, 10, 20, etc.). In one example, a dynamic manifest is generated that includes references to fragments for Mozart in the Jungle, the preview for Transparent, and the preview for Sneaky Pete. In other implementations, when a dynamic manifest is generated, some of the fragments referenced in the feature manifest are removed. For example, fragments are removed to maintain the total playback duration of the episode of Mozart in the Jungle after advertisement fragments have been added. In another example, fragments are removed in order to limit the amount of certain types of content, e.g., content inappropriate for younger viewers.

Each fragment added to or removed from the manifest includes an index of a playback order of the fragments. The position of the index in the playback order can be based on the total playback duration of the previous fragments. For example, if two feature fragments with playback durations of 5 seconds are added to the manifest, then the third fragment to be added has an index of 10 seconds e.g., an unadjusted index. This is the case even where the fourth fragment to be added is another feature fragment. In this case, the fourth fragment would have an unadjusted index of 15. Using the unadjusted index for the fourth fragment in a request would result in an out of sequence fragment being provided to the client device. As such, an unadjusted index is adjusted prior to identifying a fragment according to a request. Techniques for adjusting indexes are discussed further below.

FIG. 4 shows an example of a manifest, which is an abstract representation of a manifest file. Different formats may be used to create manifest 402. In some implementations, manifest 402 is created using an Extensible Markup Language (XML) formatted document, but could also be provided any other markup language, for example, javascript object notation (JSON). As shown in FIG. 4, manifest 402 includes references to fragments encoded at 4K HD and 1080p quality levels. Manifest 402 can also include a variety of other quality levels (e.g., 720p, 576i, 480p, etc.) encoded at different bitrates (e.g., 5,800 kbps, 4800 kbps, 3200 kbps, 1200 kbps, etc.). Manifest 402 includes references to fragments associated with feature content (e.g., fragments A, B, C, and D) and references to fragments associated with advertisement content (e.g., fragments X and Y). Each fragment includes an index or time range (e.g., Time range=0 minutes 0 seconds to 0 minutes 5 seconds) and a location of the fragment (e.g., Location=\Wedia\Movies\A093b2b_1.ismv). The manner in which an index is represented may vary, for instance, the index may be represented by a time range, a byte offset, a start time (1 hour and 5 seconds of total playback duration of 2 hours), a total duration of the fragment, relative position determined based on positions of the second fragments and the requested first fragment, a number (e.g., fragment 123 of 250 total fragments), etc.

In some implementations, as a manifest is generated, references to feature fragments are included in the manifest at particular positions, or cue points, between feature fragments. As a result, advertisement fragments can be included in a manifest such that as feature content transitions to advertisement content playback is not interrupted (e.g., without rebuffering events or visual artifacts). The manner in which advertisement fragments are included among feature fragments can vary. Advertisement fragments can be included in pre-roll (before media content begins playback), mid-roll (during playback of media content), and post roll locations (after media content completes playback). In some implementations, advertisement fragments are included in a manifest according to fixed cue points and durations. In one example, a developer manually configures a manifest to be generated with advertisement fragments at a designated cue point. Using the example of FIG. 4, manifest 402 can be one of many manifests to have advertisement fragments included after 10 seconds of playback for a total duration of 10 seconds. The location of the fixed cue point and/or duration can be updated or changed according to developer preference (e.g., the developer changes the cue point from 10 seconds to 5 seconds and a total duration from 10 seconds to 15 seconds). In another example, manifests are configured to include advertisement fragments periodically, for example, every 5, 10, or 15 minutes of playback. Alternatively, advertisement fragments are included in manifests based on determinations made by a media server. For example, a media server identifies characteristics of client devices and/or characteristics of the feature content to identify cue points in the manifest to include advertisement fragments. The characteristics that the media server can identify include client device characteristics (e.g., location of client device, playback history, time of day, shopping habits associated with a user account, etc.) and feature content characteristics such as types of scenes (e.g., an opening credits scene, a closing credits scene, a scene with a considerable movement, a change from a scene with relatively little movement to a scene with a greater amount of movement, etc.).

Returning to FIG. 3, edge server 102 provides manifest 108a to client device 104a (308), and client device 104a receives manifest 108a (310). Client device 104a identifies a bitrate for reliable playback of media content according to its available bandwidth and/or available computing resources. Next, client device 104a sends a request for a fragment at the identified bandwidth (312) according to manifest 108a, and edge server 102 receives the request for the fragment (312). Upon receiving the request, edge server 102 determines whether the requested fragment is stored locally (316). If the fragment is stored locally, then edge server 102 identifies the stored fragment (334) and provides the fragment to client device 104a (336). For example, if the requested fragment is stored in a cache, then the fragment can be identified quickly and provided to the client device 104a. For example, edge server 204a of FIG. 2 may search memory 208 and/or fragment cache 214 to determine whether a fragment associated with an index, e.g., a start time of 5 seconds has been previously stored. However, if the requested fragment is not stored locally, then edge server 102 determines whether the requested fragment corresponds to a feature fragment or an advertisement fragment (318). In some implementations, prior to checking to see if the fragment is stored locally, edge server 102 first determines whether the requested fragment is a feature fragment or an advertisement fragment. In order to determine whether a fragment is an advertisement fragment or a feature fragment, edge server 102 may use additional data added to a URL included in the fragment request (e.g., a location identifier, the start time, a fragment identifier, etc.). In some implementations, edge server 102 uses a start time as an identifier (e.g., client device 104a requests the fragment starting at 1 minute and 5 seconds) or a byte offset representing a start time (e.g., client device 104a requests a fragment according to a byte offset for the fragment starting at 1 hour, 1 minute, and 55 seconds).

As mentioned above, the identifier can be included as part of a URL used in the fragment request; however, the identifier can also be included as a separate request sent together with the fragment request. In one example, a request for feature fragments and advertisement fragments include a URL such as http://www.example.com/Mozart-.ism/QualityLevels(1000000)/Fragments(video=0). In some implementations, a URL of an advertisement fragment has a different structure than a feature fragment. For example, a request for an advertisement fragment includes a URL such as http://www.example.com/Mozart.ism/QualityLevels (1000000)/Fragments(video=30000000000)/AdStart (30000000000)/AdLength(5000000000)/AdID(TransparentAd). In another example using FIG. 4, manifest 402 shows references to advertisement fragments and feature fragments with contiguous time ranges (e.g., fragments playback durations of 1-5 seconds, 6-10 seconds, 11-15 seconds, 16-20 seconds, etc.). In this example, instead of using start time to identify a fragment, the fragment is identified based on a location (e.g., Location=\Media\Movies\A093b2b_2.ismv compared to Location=\Media\Ads\B22x_2.ismv).

Figure 5:
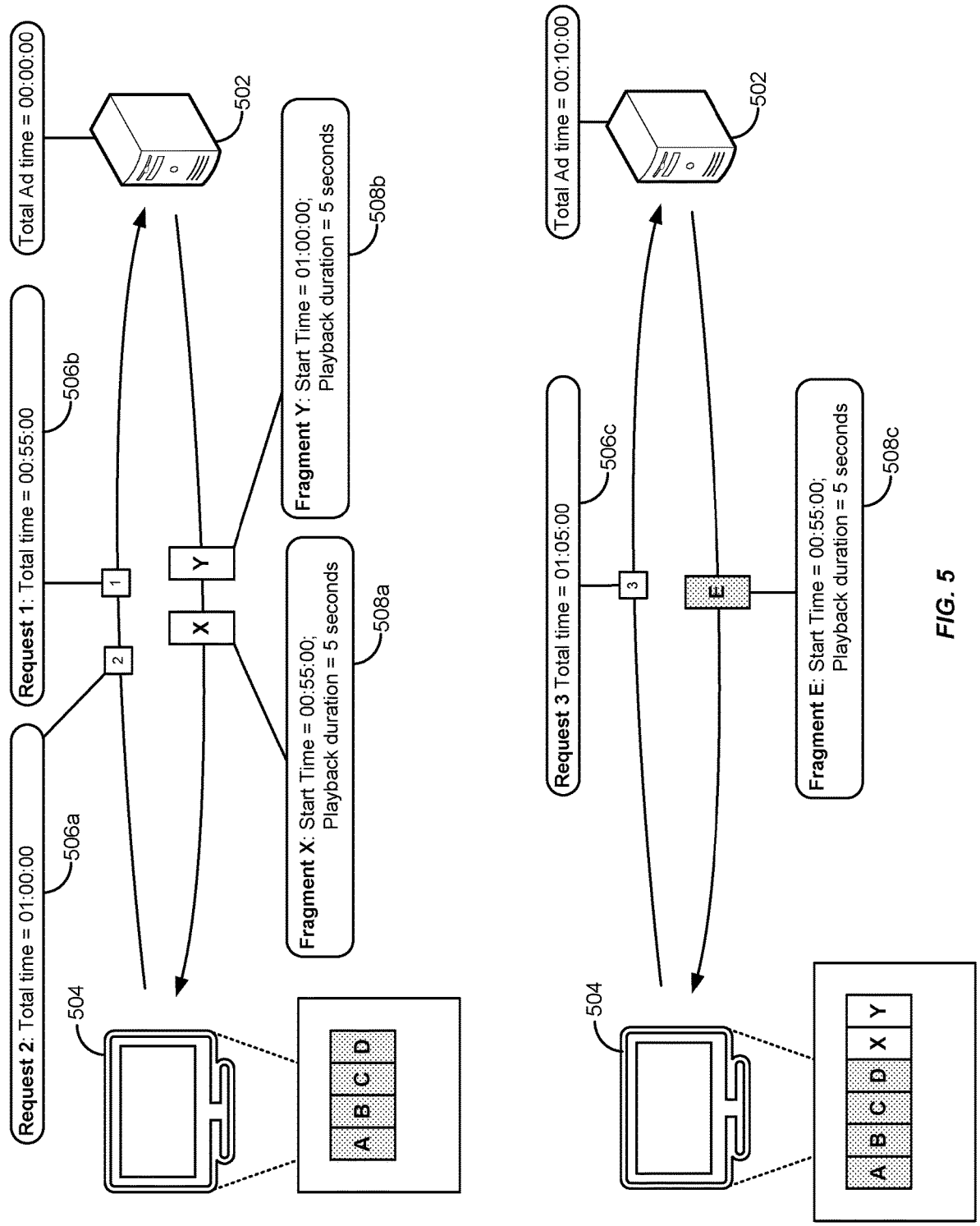
FIG. 5 shows an example of identifying fragment start times.

After determining whether a requested fragment corresponds to a feature fragment or an advertisement fragment, edge server 102 identifies an index included for the request fragment indicated in a manifest, e.g., a start time associated with the requested fragment. In some implementations, identifying a start time is included as part of block 318, but it can also be a separate process from block 318. Edge server 102 may uses the start time of a fragment to identify a locally stored fragment or to send a request for the fragment to origin server 106a. In some implementations, edge server 102 adjusts an index or start time associated with the request. In other implementations, a relative position can be determined based on playback duration of the requested fragment and the previously sent fragments. As an illustration, FIG. 5 shows an example of identifying fragment start times. In FIG. 5, edge server 502 is receiving requests 506a-c from client device 504. Requests 506a-c include requests for fragments at particular start times. For example, fragment 508a is for a fragment that starts at 55 seconds, and fragment 508b is for a fragment that starts at 1 minute. Prior to receiving these requests, client device 504 has received 54 seconds of feature fragments. When edge server 502 receives requests 506a and 506b, edge server 502 determines that fragments 508a and 508b are advertisement fragments and identifies start times at 55 seconds and 1 minute respectively. In some implementations, server 502 tracks and stores a playback duration for the total length of the advertisement fragments provided to client device 504 (e.g. 10 seconds). Requests 506a and 506b for fragments 508a and 508b are identified according to the unadjusted start times and are provided to client device 504. In contrast to requests 506a and 506b, when edge server 502 receives requests 506c, edge server 502 determines that fragment 508c is a feature fragment. In this case, the request includes a request for a fragment with a start time of 1 minute and 5 seconds. However, if edge server 502 were to identify a fragment according to the unadjusted start time, the fragment provided to client device 504 would not be the next feature fragment in the playback of the feature content (e.g., after the advertisement content finished playing, the feature content to start playing back would be 10 seconds ahead of the correct start time). As such, after determining that request 3 is for a feature fragment, edge server 502 compares the start time in the request to the total playback duration for the advertisement fragments (e.g., 10 seconds). Edge server 502 determines the difference between the start time in the request and the total playback duration for the advertisement fragments and identifies fragment 508c according to the adjusted start time (e.g. 55 seconds). The manner in which determining an adjusted start time may vary according to the protocol in which the requests are made. For example, if a client device is using the DASH protocol, similar determinations can be made using byte offsets that represent start times and playback durations. It should be noted that despite reference to the particular examples above, the manner in which the above-discussed techniques are implemented can be performed according to alternative adaptive bitrate streaming protocols that are known to those skilled in the art.

Returning to FIG. 3, if the requested fragment is an advertisement fragment, then edge server 102 requests the advertisement fragment at the identified start time from origin server 106a (320). Origin server 106a receives the request and generates and/or retrieves an advertisement fragment (324). In some implementations, advertisement fragments are encoded prior to the request from edge server 102a. Advertisement fragments can be encoded using the same encoding profile that is used for the feature fragments allowing for matching playback advertisement fragments and feature fragments. In particular, the encoding profile can use the same audio codec, audio channels, audio sample rate, video codec, some or all the bitrates of the feature fragments, framerate, video bit depth, color space, display aspect ratio, etc. origin server 106*a* sends the fragment to edge server 102 (326), which is stored in a cache for subsequent retrieval, discussed further above. Edge server 102 identifies the advertisement fragment in a similar manner previously discussed above (334). In other implementations, instead of identifying the fragment according to block 334, the fragment is sent directly to client device 104*a*. Similar to generating an advertisement fragment, if a requested fragment corresponds to a feature fragment, edge server 102 sends a request to origin server 106*b* for the feature fragment at the identified time. Origin server 106*b* receives the request, generates a feature fragment (328), and sends the feature fragment to edge server 102 (332). Edge server 102 then provides the fragment to client device 104*a* (336), client device 104*a* receives the fragment (338), and renders the fragment for playback on client device 104*a* (340).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more processors and memory configured to:
    provide a manifest having playback options for a sequence of fragments to a client device, the fragments including first fragments representing first media content from a first source and second fragments representing additional content for insertion during playback of the first media content, wherein the second fragments are from a second source that is different from the first source, and wherein the first fragments and the second fragments have corresponding indices representing the sequence of fragments;
    receive a request for one or more fragments of the sequence of fragments;
    determine the one or more fragments are one or more second fragments representing the additional content;
    provide the one or more second fragments to the client device;
    determine a playback duration of the one or more second fragments provided to the client device;
    receive a request for a subsequent fragment from the client device, the subsequent fragment being subsequent to the one or more fragments, the request including an index for the subsequent fragment;
    determine that the subsequent fragment represents the first media content;
    based on the determination that the subsequent fragment represents the first media content, adjust the index included with the request for the subsequent fragment based on the playback duration;
    identify the subsequent fragment using the adjusted index; and
    provide the subsequent fragment to the client device.

2. The system of claim 1, wherein the one or more processors and memory are configured to determine that the subsequent fragment is associated with the first media content by identifying characteristics in a uniform resource locator (URL) of the request, the characteristics including one or more of: a location identifier, the index, or a fragment identifier.

3. The system of claim 1, wherein the one or more processors and memory are configured to:
    receive a request for playback of the first media content from the client device;
    request a manifest associated with the first media content from a server;
    receive the manifest, the manifest including the index for the subsequent fragment;
    store the manifest in a cache of the system; and
    provide the manifest to the client device.

4. The system of claim 1, wherein the index is one of: a start time, a byte range, or a relative position in relation to the second fragments.

5. The system of claim 1, wherein the one or more processors and memory are configured to:
    determine that the subsequent fragment is not stored at a first server;
    transmit a second request for the subsequent fragment to a second server;
    receive the subsequent fragment at the first server; and
    store the subsequent fragment at the first server.

6. The system of claim 5, wherein the first server is an edge server controlled by a first provider, and wherein the second server is an origin server controlled by a second provider different from the first provider.

7. The system of claim 1, wherein the one or more processors and memory are configured to:
    receive a request for playback of second media content from a second client device; and
    provide an additional plurality of fragments to the second client device, the additional fragments including the second fragments and third fragments representing second media content different from the first media content associated with the first fragments.

8. The system of claim 1, wherein the request includes a protocol specification, an edge server location, a quality level, the index of the subsequent fragment, and a playback duration of the subsequent fragment.

9. A computer-implemented method, comprising:
    providing a manifest having playback options for a sequence of fragments to a client device, the fragments including first fragments representing first media content from a first source and second fragments representing additional content for insertion during playback of the first media content, wherein the second fragments are from a second source that is different from the first source, and wherein the first fragments and the second fragments have corresponding indices representing the sequence of fragments;
    receiving a request for one or more fragments of the sequence of fragments;
    determining the one or more fragments are one or more second fragments representing the additional content;
    providing the one or more second fragments to the client device;

determining a playback duration of the one or more second fragments provided to the client device;

receiving a request for a subsequent fragment from the client device, the subsequent fragment being subsequent to the one or more fragments, the request including an index for the subsequent fragment;

determine that the subsequent fragment represents the first media content;

based on the determination that the subsequent fragment represents the first media content, adjusting the index included with the request for the subsequent fragment based on the playback duration;

identifying the subsequent fragment using the index; and providing the subsequent fragment to the client device.

10. The method of claim 9, further comprising determining that the subsequent fragment is associated with the first media content by identifying characteristics in a uniform resource locator (URL) of the request, the characteristics including one or more of: a location identifier, the index, or a fragment identifier.

11. The method of claim 9, further comprising:
receiving a request for playback of the first media content from the client device;
requesting a manifest associated with the first media content from a server;
receiving the manifest, the manifest including the index for the subsequent fragment;
storing the manifest in a cache; and
provide the manifest to the client device.

12. The method of claim 9, wherein the index is one of: a start time, a byte range, or a relative position in relation to the second fragments.

13. The method of claim 9, further comprising:
determining that the subsequent fragment is not stored at a first server;
transmitting a second request for the subsequent fragment to a second server;
receiving the subsequent fragment at the first server; and
storing the subsequent fragment at the first server.

14. The method of claim 13, wherein the first server is an edge server controlled by a first provider, and wherein the second server is an origin server controlled by a second provider different from the first provider.

15. The method of claim 9, further comprising:
receiving a request for playback of second media content from a second client device; and
providing an additional plurality of fragments to the second client device, the additional fragments including the second fragments and third fragments representing second media content different from the first media content associated with the first fragments.

16. The method of claim 9, wherein the request includes a protocol specification, an edge server location, a quality level, the index of the subsequent fragment, and a playback duration of the subsequent fragment.

* * * * *